B. G. GILBOUGH.
AUTOMOBILE LOCK.
APPLICATION FILED JULY 9, 1917.
1,261,226. Patented Apr. 2, 1918.
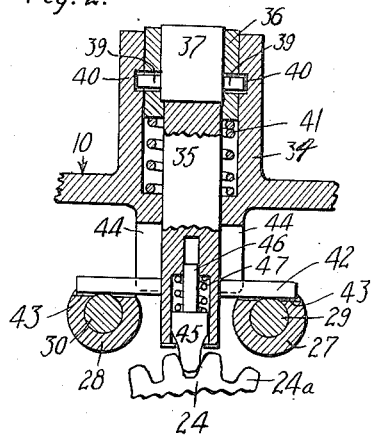
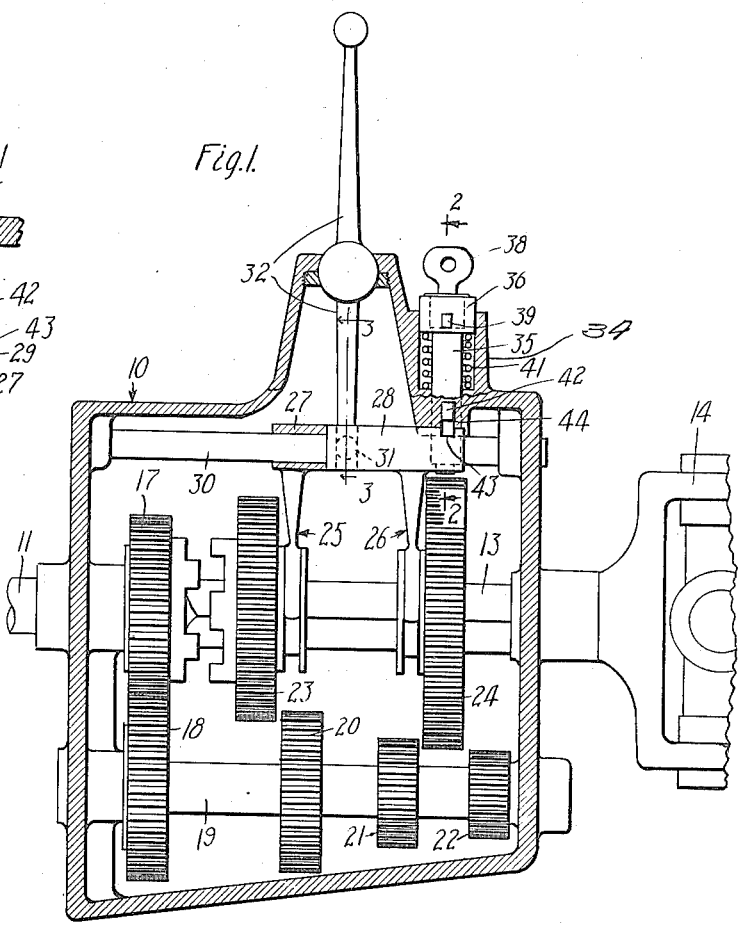
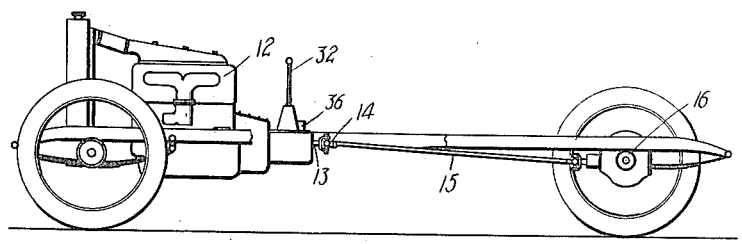
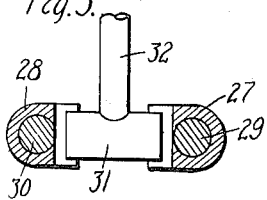
Inventor
Benjamin G. Gilbough
by James T. Bankelew
his Attorney

UNITED STATES PATENT OFFICE.

BENJAMIN G. GILBOUGH, OF LOS ANGELES, CALIFORNIA.

AUTOMOBILE-LOCK.

1,261,226.

Specification of Letters Patent.

Patented Apr. 2, 1918.

Application filed July 9, 1917. Serial No. 179,339.

*To all whom it may concern:*

Be it known that I, BENJAMIN G. GIL-BOUGH, a citizen of the United States, residing at Los Angeles, in the county of Los Angeles, State of California, have invented new and useful Improvements in Automobile-Locks, of which the following is a specification.

This invention relates to automobile locks; and, in its application and adaptation to an automobile having running gear, propulsion mechanism, and a transmission and gear shift mechanism, it is an object of this invention to provide a lock in which the running gear and the gear shift mechanism are both locked, so that the automobile cannot be either moved away under its own power, or towed away by other power. With this general object in view it is also an object of this invention to provide a single, simple locking means for accomplishing the locking operation set forth, to coöperatively and simultaneously effect the locking of the parts described.

In accomplishing these objects, I prefer to provide a lock which is applied to the transmission mechanism, coöperatively locking the gear shift devices and the driven part of the mechanism (this part of the mechanism being permanently drivingly connected with the drive wheels of the automobile). In a typical transmission mechanism the propeller shaft (the driven shaft of the transmission) has thereon one or more gears; and I prefer to apply my lock to one of these gears. The typical transmission usually also has a pair of sliders which are connected to the shiftable gears and are operated by the gear shift lever. I find it convenient to lock the gear shift devices by locking these sliders. In the following specification I therefore describe a preferred form of device in which the single locking mechanism is coöperatively applied to the sliders and to a gear on the driving shaft of the transmission; but it will be understood that such a specific application and arrangement is only illustrative and indicative of my invention and that I do not limit my invention to the lock acting upon these particular parts.

For the purpose of this specification I refer to the accompanying drawings in which Figure 1 is a longitudinal section showing a typical transmission equipped with my lock; Fig. 2 is an enlarged detail section taken on line 2 of Fig. 1; Fig. 3 is a detail section taken as indicated by line 3—3 on Fig. 1; and Fig. 4 is a view showing my lock as it is applied to an automobile.

In the drawings the numeral 10 designates any typical transmission case into which the engine shaft 11 enters from the engine 12 and out of which the driven shaft 13 emerges to be connected through universal joint 14 and propeller shaft 15 with the rear driving wheel mechanism 16. The driving shaft 11 of the transmission carries the usual gear 17 meshing with gear 18 on counter shaft 19; and this shaft 19 carries gear 20, 21 and 22 adapted to be drivingly engaged by the two slidable gears 23 and 24 on the driven shaft 13. It is unnecessary here to go into the details of operation of the transmission mechanism, as such operation is commonly well known. In Fig. 1 the gears 23 and 24 are shown in their neutral positions, out of operative engagement with the other gears; so that in this position no driving relation is effected between shafts 11 and 13. The gears 22 and 24 are shifted through the medium of shifter members 25 and 26 mounted upon sliders 27 and 28, respectively. In the form of mechanism herein shown these sliders 27, 28, slide on rods 29 and 30 and are shifted, in a typical case, by the engagement with them of the lower end part 31 of gear shift lever 32. This gear shift lever is in position to be engaged with either one or the other of the sliders. In order to move either of the gears 23, 24, it is seen to be necessary to move one or the other of the sliders; if the sliders are locked against movement it is impossible to move the gears 23 and 24 and impossible to effect a driving relation between the shaft 11 and the shaft 13. If, at the same time, the shaft 13 is locked against rotation, then the automobile cannot be moved because its rear driving or traction wheels are locked against rotation. This may be effected by locking either of the gears 23 and 24.

My preferred form of lock mechanism embodies a locking member 35 preferably mounted in an extension or boss 34 on the transmission case, and preferably, in this specific form of device, vertically movable. This locking member 35 has a head 36 in which a lock mechanism 37 of any desired character may be carried. For instance, this lock mechanism 37, operated by a key 38, may actuate a pair of bolts 39, which enter apertures 40 when the member 35 is pressed down against the raising action of a spring 41. This spring 41 raises the locking device to its normal unlocked position, shown in Fig. 1. When the locking member 35 is pressed down to its locking position, shown in Fig. 2, a transverse lock bar 42 enters slots 43 in the sliders 27 and 28 and thus holds the sliders against movement. This transvers lock bar 42 is mounted in or on the member 35 and slides vertically in slots 44. The bar 42 striking the upper ends of these slots serves as a stop to the upward movement of the locking member.

When the locking member is pressed down to its locking position, a locking pin 45 is pressed down into engagement with the teeth 24ª of gear 24. This locking pin 45 has its lower end shaped to fit into a space between two adjacent teeth; and is movably mounted in the lower end of the locking member 35. This pin 45 has a shank 46 that projects up into the member 35; and a spring 47 presses the pin downwardly. The arrangement is such that if a tooth 24 should happen to be below a pin 45 when it is pressed down, then the pin 45 may be temporarily pressed back up into the member 35; but upon any attempted movement of the automobile the pin 45 will immediately drop into a space between the teeth as soon as the gear 24 is moved slightly.

From the foregoing specification the features and scope of my invention may be understood. I do not limit myself to the particular arrangements and details herein described, believing my invention to be broad in its nature and therefore including many possible variations and changes. The following claims are therefore directed to the invention in its broad as well as in its specific nature.

Having described my invention, I claim:

1. In combination with a transmission mechanism having a set of transmission gears including shiftable gears and a driven shaft with a gear thereon, a single locking means for coöperatively locking the shiftable gears against being shifted and for locking the driven shaft gear against rotation.

2. In combination with a transmission mechanism having a set of transmission gears including shiftable gears, means for shifting said gears including sliders and a driven shaft carrying a gear; a single locking means adapted to coöperatively lock the sliders against shifting movement and to lock the driven shaft gear against rotation.

3. In combination with a transmission mechanism having a set of transmission gears including shiftable gears, means for shifting said gears including sliders, and a driven shaft carrying a gear; a single locking means adapted to coöperatively lock the sliders against shifting movement and to lock the driven shaft gear against rotation, said locking means embodying a longitudinally movable locking member controlled by a lock mechanism, a locking pin on the end of said member adapted to engage the teeth of the driven shaft gear, and a lock bar on said member adapted to engage said sliders.

4. In combination with a transmission mechanism having a set of transmission gears including shiftable gears, means for shifting said gears including sliders and a driven shaft carrying a gear; a single locking means adapted to coöperatively lock the sliders against shifting movement and to lock the driven shaft gear against rotation, said locking means embodying a longitudinally movable locking member controlled by a lock mechanism, a locking pin on the end of said member adapted to engage the teeth of the driven shaft gear, and a lock bar on said member adapted to engage said sliders, said locking pin being resiliently mounted upon the locking member so that the pin may be pressed back into said member by engagement with a gear tooth and then subsequently moved into a space between gear teeth when the gear is subsequently moved.

5. In combination with a transmission mechanism having a pair of shafts and a set of transmission gears including shiftable gears; a single locking means for coöperatively locking the shiftable gears against being shifted and for locking one of the shafts against rotation.

6. In combination with a transmission mechanism having a set of transmission gears including shiftable gears, sliders for shifting said gears; a locking means acting directly on the sliders to lock them against movement, and means in connection with said locking means to lock one of the gears against rotation.

7. In combination with a transmission mechanism having a set of transmssion gears including shiftable gears; locking means for the gears to positively lock them against shifting movement, and means in connection with said locking means to lock one of the gears against rotation.

8. In combination with a transmission mechanism having a set of transmission gears, means to lock a gear from rotation including a lock plunger movable to and from the gear, and a spring supported lock pin in the plunger adapted to engage the gear teeth.

9. In combination with a transmission mechanism having a set of transmission gears including shiftable gears, sliders for shifting the gears, and a locking member having a lock bar for engaging the sliders and having a member for engaging the teeth of a transmission gear.

In witness that I claim the foregoing I have hereunto subscribed my name this 25th day of June, 1917.

BENJAMIN G. GILBOUGH.